No. 876,464. PATENTED JAN. 14, 1908.
J. E. & J. P. LARSON.
CORN GATHERER AND PICKER.
APPLICATION FILED JUNE 25, 1906.
2 SHEETS—SHEET 1.
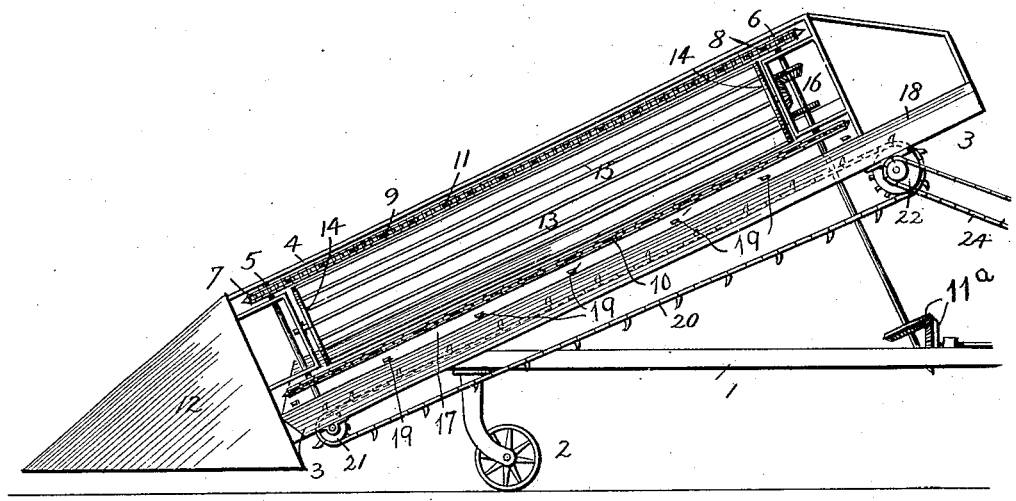
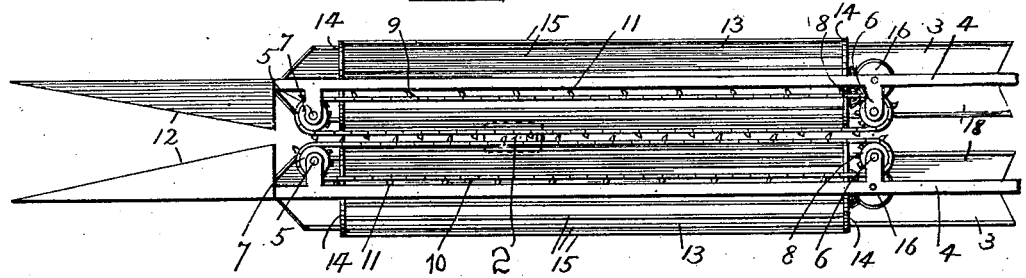
Witnesses
F. L. Durand
C. H. Griesbauer
Joseph E. Larson
John P. Larson
Inventors
by H. B. Willson & Co.
Attorneys No. 876,464. PATENTED JAN. 14, 1908.
J. E. & J. P. LARSON.
CORN GATHERER AND PICKER.
APPLICATION FILED JUNE 25, 1906.
2 SHEETS—SHEET 2.
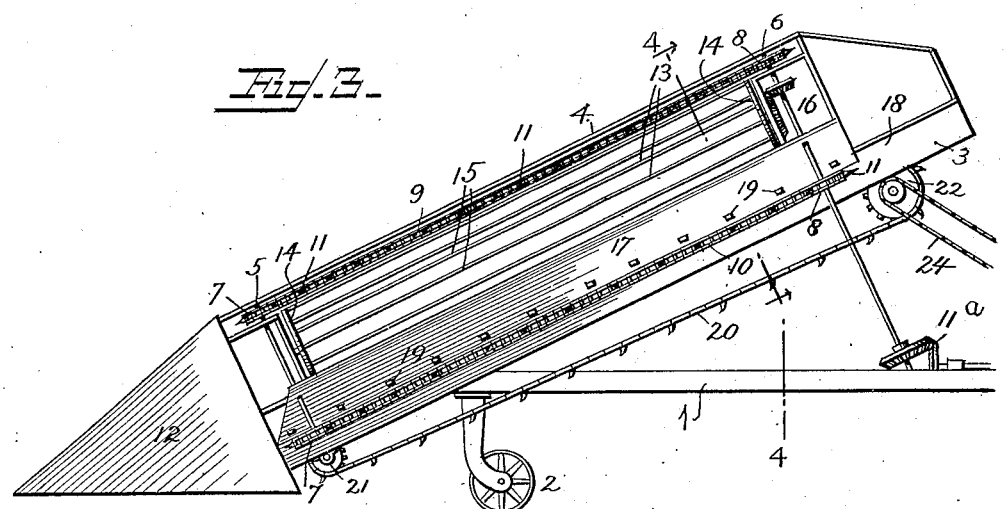
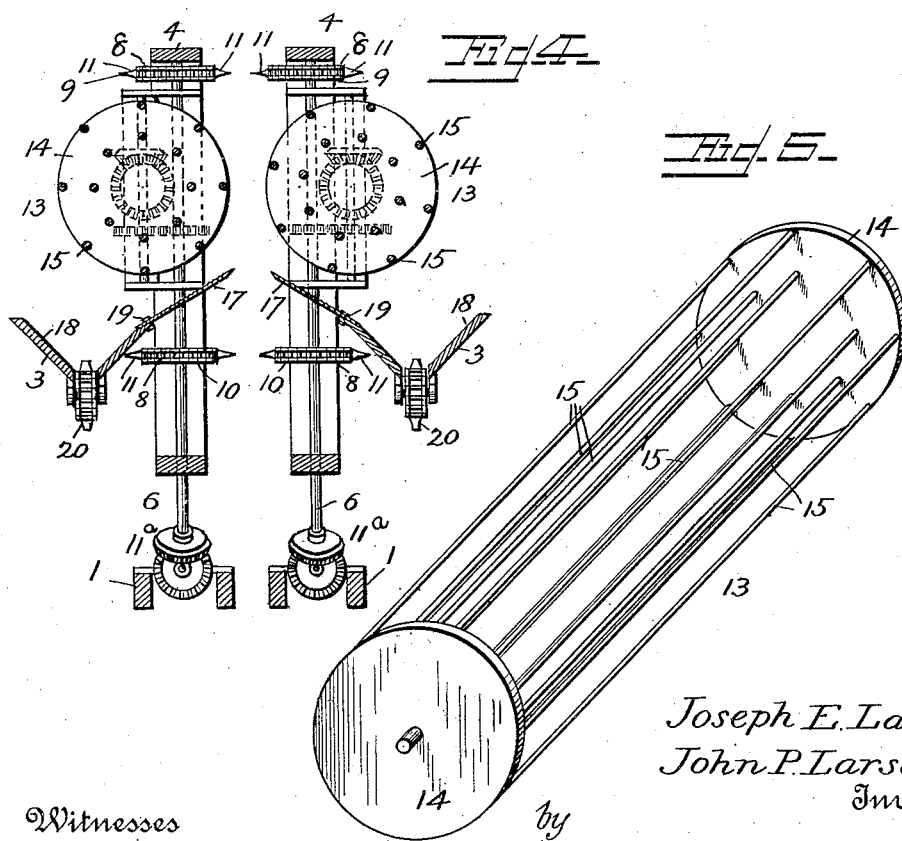
Joseph E. Larson
John P. Larson
Inventors
Witnesses
F. L. Durand
C. H. Gresbauer
by
H. B. Willson & Co.
Attorneys

UNITED STATES PATENT OFFICE.

JOSEPH E. LARSON AND JOHN P. LARSON, OF SILVER CREEK, NEBRASKA.

CORN GATHERER AND PICKER.

No. 876,464.  Specification of Letters Patent.  Patented Jan. 14, 1908.

Application filed June 25, 1906. Serial No. 323,272.

*To all whom it may concern:*

Be it known that we, JOSEPH E. LARSON and JOHN P. LARSON, citizens of the United States, residing at Silver Creek, in the county of Merrick and State of Nebraska, have invented certain new and useful Improvements in Corn Gatherers and Pickers; and we do declare the following to be a full, clear, and exact description of the invention, such as will enable others skilled in the art to which it appertains to make and use the same.

This invention relates to corn gatherers and pickers; and one of the principal objects of the same is to provide means for cutting the ears from the stalks and conveying the ears to a suitable husking mechanism.

Another object of the invention is to provide means for cutting the ears from the stalks as the machine is passing along the row of corn and to hold the ears down to the cutting mechanism and to drop the ears after they are cut into a suitable feed trough provided with a conveyer chain to carry the ears back to the husking mechanism.

Still another object is to simplify the construction of devices of this character and to render them more reliable and efficient in operation.

The objects and advantages above referred to are attained by means of the construction illustrated in the accompanying drawings, in which:

Figure 1 is a side elevation of a corn gatherer and picker made in accordance with our invention; Fig. 2 is a top plan view of the same; Fig. 3 is a longitudinal section; Fig. 4 is a transverse section taken on the line 4—4, Fig. 3; and Fig. 5 is a perspective view of one of the feeding reels for holding the ears of corn down to the knives.

Referring to the accompanying drawings for a more particular description of our invention, the numeral 1 designates the main frame of the machine, which may be mounted upon wheels, (not shown), and a caster wheel 2 at the front part of the machine.

Mounted upon the frame of the machine is a pair of oppositely-disposed spaced feed troughs 3 with a superposed framework 4 mounted thereon. Journaled in this framework are shafts, 5, 6 carrying sprocket wheels 7, 8, and passing around these sprocket wheels are feeding chains 9, 10 provided with feeding fingers 11 at suitable intervals. These sprocket chains are operated by means of beveled gearing $11^a$ driven from the ground wheels of the machine in the usual manner.

Upon the front portion of the frame the flaring gathering noses 12 are secured. Journaled at opposite ends in the framework and superposed above the feeding troughs are the feeding reels 13. These reels comprise end disks 14 and longitudinal rods 15 extending through and secured to said disks. These reels are rotated downwardly on the sides next the stalk passages to present the ears to the cutters or knives 17 by means of the beveled gears 16.

The knives 17 are inclined upwardly and as the cutting edges are disposed between the feeding rolls, so that as the corn is held down upon the cutting edges and the machine is drawn across the field, the cutters will sever the ears and drop them into the feeding troughs 18. The knives or cutters are secured by bolts 19 to the inner member of the troughs, and said troughs are provided with conveyer chains 20 for carrying the ears backward to any suitable husking mechanism, not shown. For operating the conveyer chains, sprocket wheels 21, 22 are secured underneath the trough and are operated by a chain 24 extending back to the main drive shaft, upon which the ground wheels are mounted.

The operation of our invention may be described as follows: As the machine is drawn across the field a row of corn passes between the gathering noses and up between the feeding fingers on the feeding chains. The feeding reels moving downwardly carry the ears down and hold them in contact with the knives and sever the ears from the stalks and drop them into feed troughs where they are carried back by the conveyer chains therein to any suitable husking devices. It is to be noted that the feeding chains upon the opposite sides of the feeding reels hold the stalk firmly at two points upon opposite sides of the cutting mechanism and upon opposite sides of the feeding reel and this arrangement renders the device reliable and efficient for the purpose. It will be understood, of course, that our invention may be applied to a machine provided with any suitable husking mechanism.

Various changes in the form, proportion and the minor details of construction may be resorted to without departing from the principle or sacrificing any of the advantages of this invention, as defined by the appended claims.

Having thus described our invention, what we claim as new and desire to secure by Letters-Patent, is:—

1. In a corn gatherer and picker, the combination of oppositely disposed gathering noses defining a longitudinally extending passage-way, spaced feeding chains arranged to operate longitudinally of the machine at the rear of said noses and forming an extension of the passage-way, rotatably mounted feeding reels arranged longitudinally of the machine on either side of the passage-way and feeding inwardly and downwardly and knives arranged below the feeding reels.

2. In a corn gatherer and picker, the combination of oppositely disposed gathering noses defining a longitudinally extending passage-way for the stalks, a feeding chain extending rearwardly from each of said noses on opposite sides of said passage-way and forming an extension thereof, knives arranged below the chains on either side of said passage-way and means arranged to rotate inwardly and downwardly on opposite sides of said passage-way for holding the corn in contact with the knives.

3. In a corn gatherer and picker, the combination of oppositely disposed gathering noses defining a longitudinally extending passage-way for the stalks, a feeding chain arranged on either side of said passage-way and forming an extension thereof, knives located below said chains on either side of said passage-way, means arranged on opposite sides of said passage-way above the knives and rotating downwardly and inwardly to hold the corn in contact with the knives and means for conveying cut-off ears of corn to a place of deposit.

4. In a corn gatherer and picker, the combination of a supporting frame, oppositely disposed gathering noses, two sets of feeding chains mounted in the rear of said noses, feeding reels journaled in said frame between the chains of the respective sets, receiving troughs disposed below said reels, knives secured to said troughs and conveyer chains in said troughs.

In testimony whereof we have hereunto set our hands in presence of two subscribing witnesses.

JOSEPH E. LARSON.
JOHN P. LARSON.

Witnesses:
J. W. JACKMAN,
N. L. SQUIRES.